United States Patent
Farrokhzad et al.

(10) Patent No.: US 10,583,458 B2
(45) Date of Patent: Mar. 10, 2020

(54) METHODS AND SYSTEMS FOR COATING HOLLOW FIBER MEMBRANE CONTACTORS

(71) Applicants: Hasan Farrokhzad, Tehran (IR); Ali Poorkhalil, Tehran (IR)

(72) Inventors: Hasan Farrokhzad, Tehran (IR); Ali Poorkhalil, Tehran (IR)

( * ) Notice: Subject to any disclaimer, the term of this patent is extended or adjusted under 35 U.S.C. 154(b) by 165 days.

(21) Appl. No.: 15/805,338

(22) Filed: Nov. 7, 2017

(65) Prior Publication Data
US 2018/0085783 A1  Mar. 29, 2018

Related U.S. Application Data

(60) Provisional application No. 62/429,813, filed on Dec. 4, 2016.

(51) Int. Cl.
  *B05D 7/22* (2006.01)
  *B05D 3/06* (2006.01)
  (Continued)

(52) U.S. Cl.
  CPC .............. *B05D 7/22* (2013.01); *B01D 63/021* (2013.01); *B01D 67/009* (2013.01);
  (Continued)

(58) Field of Classification Search
  None
  See application file for complete search history.

(56) References Cited

U.S. PATENT DOCUMENTS

| 5,914,154 | A | * | 6/1999 | Nemser | ...................... | A61L 9/16 |
| | | | | | | 427/235 |
| 8,167,143 | B2 | | 5/2012 | Sirkar et al. | | |
| 2014/0154495 | A1 | * | 6/2014 | Hiraoka | ............... | B01D 65/102 |
| | | | | | | 428/311.11 |

FOREIGN PATENT DOCUMENTS

WO   2008088293 A1   7/2008

OTHER PUBLICATIONS

P.T. Nguyen et al., A dense membrane contactor for intensified CO2 gas/liquid absorption in post-combustion capture, Journal of Membrane Science, 2011, vol. 377, pp. 261-272.
(Continued)

*Primary Examiner* — Shamim Ahmed
*Assistant Examiner* — Bradford M Gates
(74) *Attorney, Agent, or Firm* — Bajwa IP Law Firm; Haris Zaheer Bajwa

(57) ABSTRACT

A method for coating hollow fiber membranes is disclosed. The method includes preparing a continuous circulating circuit, which includes a membrane contactor module, two liquid reservoirs containing a solvent, two pipeline paths, and at least one injector. The membrane module include a plurality of hollow fiber membranes with an inside area and an outside area, and a housing, where the plurality of hollow fiber membranes are extended inside the housing. The method further include forming a plurality of wetted hollow fiber membranes with the solvent by circulating the solvent through the continuous circulating circuit, filling at least one of the two liquid reservoirs with a coating solution, forming a coating layer on a surface of at least one of the inside area or the outside area of the plurality of wetted hollow fiber membranes by circulating the coating solution through the continuous circulating circuit, and forming a uniform coating layer by injecting the coating solution by the injector for intrusion of the coating solution through the coating layer.

17 Claims, 13 Drawing Sheets

(51) Int. Cl.
  *C08J 7/04* (2020.01)
  *B01D 69/12* (2006.01)
  *B01D 71/34* (2006.01)
  *B01D 67/00* (2006.01)
  *B01D 71/60* (2006.01)
  *B01D 69/08* (2006.01)
  *B01D 63/02* (2006.01)
  *B01D 71/70* (2006.01)
(52) U.S. Cl.
  CPC ..... *B01D 67/0083* (2013.01); *B01D 67/0088* (2013.01); *B01D 69/08* (2013.01); *B01D 69/12* (2013.01); *B01D 71/34* (2013.01); *B01D 71/60* (2013.01); *B01D 71/70* (2013.01); *B05D 3/065* (2013.01); *C08J 7/047* (2013.01); *B01D 2323/04* (2013.01); *B01D 2323/345* (2013.01); *B01D 2323/42* (2013.01); *C08J 2381/06* (2013.01); *C08J 2483/04* (2013.01)

(56) References Cited

OTHER PUBLICATIONS

Marius Sandru et al., Composite hollow fiber membranes for CO2 capture, Journal of Membrane Science, 2010, vol. 346, pp. 172-186.
Takayuki Kouketsu, PAMAM dendrimer composite membrane for CO2 separation: Formation of a chitosan gutter layer, Journal of Membrane Science, 2007, vol. 287, pp. 51-59.

* cited by examiner

METHODS AND SYSTEMS FOR COATING HOLLOW FIBER MEMBRANE CONTACTORS

CROSS-REFERENCE TO RELATED APPLICATION

This application claims the benefit of priority from U.S. Provisional Patent Application Ser. No. 62/429,813, filed on Dec. 4, 2016, and entitled "EXTRACTION OF A GAS FROM A GASEOUS MEDIUM FLOW," which is incorporated herein by reference in its entirety.

SPONSORSHIP STATEMENT

This application has been sponsored by Iran Patent Office, which does not have any rights in this application.

TECHNICAL FIELD

The present disclosure generally relates to methods and systems for continuous coating membrane contactors, and particularly, to a method and system for uniformly hydrophobic coating a bundle of hollow fiber membranes.

BACKGROUND

Membrane contactors have been used for a long time in order to achieve more efficient separation operations, in place of classical processes based on direct contact between two fluid phases, such as gas-liquid absorption, for example, removal of $CO_2$, $H_2S$, or other compounds from gases streams like as natural gas, exhaust gases, etc. A membrane contactor usually consists of a bundle of hollow fibers placed in a membrane module where the fluids flow on each side of the hollow fibers without any direct contact. In addition, membrane contactors provide improved hydrodynamic distribution effects, minimal liquid losses and ease of scale-up.

One problem when using membrane contactors for extraction of a specific gas from a gas stream through absorption by a liquid stream in a hollow fiber membrane contactor is the penetration of the liquid medium into the membrane contactor pores that leads to wetting of the pores and the liquid medium reaching the "medium side", where the gas stream to be treated is situated and a miscibility of gas and liquid phases occurs. Wetted pores can increase the resistance to mass transfer and severely slow down or even completely inhibit diffusion of the gas to be extracted through the membrane, and as a result decrease the process efficiency.

In order to prevent wetting of the pores, the membrane contactors are made from a hydrophobic material such as polyvinylidene fluoride (PVDF) and polytetrafluoroethylene (PTFE), or the absorber side of a respective membrane contactor may be coated with hydrophobic polymers such that the absorption liquid cannot be in direct contact with the absorber side. However, due to the expensive nature of hydrophobic polymers, expensive and long-term non-continuous coating processes, using hydrophobic membrane contactors cause the device to become prohibitively expensive. Recently, methods have been developed for the continuous coating of hollow fibers, but these methods still have various limitations in obtaining a uniform, thin and regular coating in order to achieve high efficiency and high gas permeability without the wetting problem for the hollow fibers.

Hence, there is a need for cost-effective and time-saving methods and systems to achieve a dense, efficient, and uniform coating layer onto the surface of conventional non-expensive hollow fibers that are typically made from hydrophilic materials or materials with lower hydrophobicity. Also, there is a need to coat both sides of a bundle of hollow fiber membranes at the same time continuously or in-situ when they have been placed in a membrane module. Furthermore, there is a need for a method and system to coat both sides of the hollow fiber membranes in a module for two-sided non-wetting purposes, such as liquid-liquid separations or extractions.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for coating hollow fiber membranes. The method may include preparing a continuous circulating circuit that may include a membrane contactor module, two liquid reservoirs containing a solvent, two pipeline paths, and at least one injector. The membrane contactor module may include a plurality of hollow fiber membranes, and a housing, where each hollow fiber membrane may include an inside area and an outside area, and the plurality of hollow fiber membranes may be extended inside the housing. The membrane contactor module and the two liquid reservoirs may be connected through the two pipeline paths. The injector may have access to the membrane contactor module via one of the two pipeline paths.

The method may further include forming a plurality of wetted hollow fiber membranes with the solvent by circulating the solvent through the continuous circulating circuit, filling at least one of the two liquid reservoirs with a coating solution, forming a coating layer on a surface of at least one of the inside area or the outside area of the plurality of wetted hollow fiber membranes by circulating the coating solution through the continuous circulating circuit, and forming a uniform coating layer by injecting the coating solution by the injector for intrusion of the coating solution through the coating layer. Moreover, the method may further include draining the solvent and the coating solution from the membrane contactor module, and forming a plurality of dried hollow fiber membranes with the uniform coating layer by drying the membrane contactor module.

In some exemplary implementations, injecting the coating solution by the injector may include stopping circulation of the coating solution through the continuous circulating circuit, filling the injector by the coating solution, and injecting the coating solution by the injector into the membrane contactor module through at least one of the two pipeline paths. The coating solution may be injected by the injector into the membrane contactor module with a flow rate of about 30 ml/min and total amount of the coating solution that may be injected by the injector may be between about 10 ml and about 120 ml.

In some exemplary implementations, the plurality of hollow fiber membranes may be made from a porous polymeric material, and the porous polymeric material may include a hydrophilic polymer, or a polymer with low-hydrophobicity, or combinations thereof. In one exemplary embodiment, the porous polymeric material may include a polysulfone, or a polyethersulfone, or a polyamide, or polypropylene (PP), or combinations thereof.

In some exemplary implementations, the coating solution may include a hydrophobic polymeric material that may include one of a siloxane-based hydrophobic polymer, polydimethylsiloxane (PDMS), a polyaniline (PANI), polyvinylidene difluoride (PVDF), or combinations thereof. The hydrophobic polymeric material may be present in the coating solution with a concentration of between about 2% and about 15%, for example 5%.

In some exemplary implementations, the uniform coating layer may include a dense layer or a porous layer with a thickness less than 200 µm. In one exemplary embodiment, the uniform coating layer may have a thickness between 5 µm and 50 µm.

In some exemplary implementations, the solvent may include a wetting agent and the solvent may be immiscible with the coating solution. In one exemplary embodiment, the solvent may include water, or n-Hexane, n-Heptane, Benzene, N-Methyl-2-pyrrolidone (NMP), or combinations thereof.

In some exemplary implementations, circulating the solvent through the continuous circulating circuit and circulating the coating solution through the continuous circulating circuit may be done with a flow rate of circulation of less than 500 cc/min.

In some exemplary implementations, drying the membrane contactor module may include at least one of curing the membrane contactor module in an oven, drying the membrane contactor module by UV irradiation, and supplying the membrane contactor module with a drying agent.

In some exemplary implementations, the method may further include forming a composite coating layer on a surface of at least one of the inside area or the outside area of the plurality of hollow fiber membranes. The composite coating layer may include at least two uniform coating layers, including a second uniform coating layer placed on top of a first uniform coating layer. In one exemplary embodiment, filling at least one of the two liquid reservoirs with a coating solution, circulating the coating solution through the continuous circulating circuit, and injecting the coating solution by the injector may be repeated in a cycle for at least two times, including at least a first time and a second time, where a first coating solution may be used at the first time and a second coating solution may be used at the second time in the cycle.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
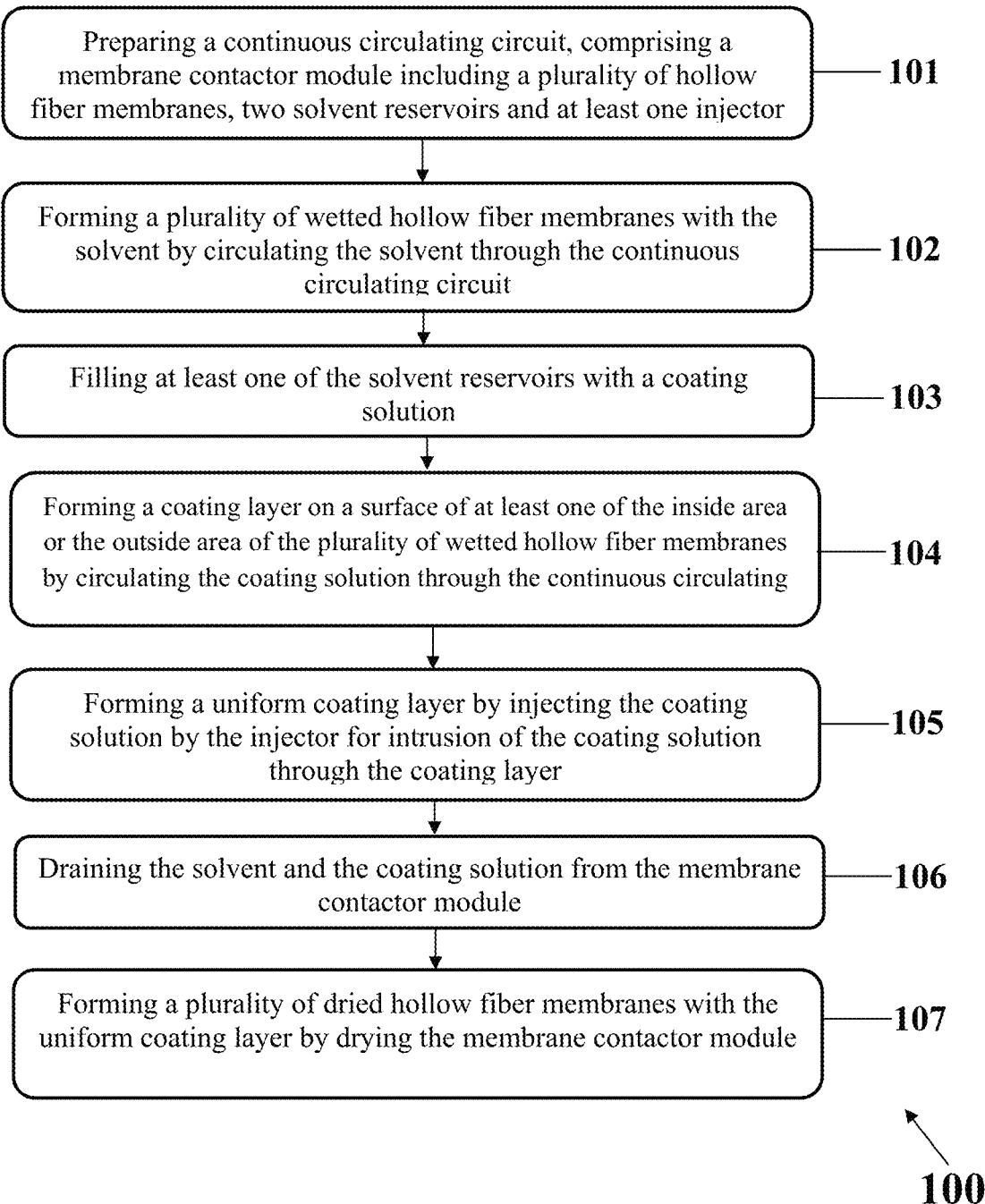
FIG. 1 illustrates a method for coating hollow fiber membranes, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Membrane contactor systems for capturing and/or separating polar gases such as $CO_2$ and $H_2S$ are desirable in a variety of applications. Exemplary gas-liquid contacting applications include carbon dioxide separation, natural gas sweetening, and the like. For example, it is often desired to extract Carbon dioxide ($CO_2$) from a gaseous medium flow in order to prevent the release of $CO_2$ in the atmosphere. A typical application of capturing polar gases is the treatment of an exhaust medium flow of a coal power plant. Further, the extraction of $CO_2$ or other gases, such as Hydrogen sulfide ($H_2S$) may be used to treat a natural gas medium flow. Depending on a geographical area in which the natural gas is produced, said natural gas can contain severe amounts of either $CO_2$ and/or $H_2S$. The extraction of such gases is advantageous for several reasons.

However, undesirable effects due to liquid contact such as gradual changes in membrane structure and/or partial wetting of the pores can dramatically affect mass transfer performances of membrane contactors. In order to achieve an efficient separation process, a highly permeable membrane material is absolutely necessary. Additionally, the membrane material must be able to withstand long term contact with a chemically reactive solvent (typically an amine such as monoethanolamine: MEA) and must be able to remain non-wetted. Using hydrophobic membranes with a high resistance to wetting minimizes the membrane mass transfer resistance and retains the membrane non-wetted state, but highly hydrophobic membranes are too expensive and thus cost prohibitive. Hence, to overcome the wetting problem and to stop any penetration of the absorber liquid into the membrane, a material which represents a real barrier to the liquid phase may be coated onto the absorber side of each hollow fiber membrane of the membrane contactor, where the hollow fibers may be made from non-expensive hydrophilic or lower hydrophobic materials.

In order to prevent wetting of the pores, it is essential for the hollow fiber membrane contactors that at least one side, possibly even both sides, of a respective membrane contactor may be equipped with a coating which prevents direct contact of the absorption liquid with the gaseous medium flow in gas-liquid applications. Advantageously, the coating may be applied at least to the absorber side of the membrane contactor in order to prevent a direct contact of the absorption liquid with the absorber side and, most importantly, the pores of the membrane contactor.

Further, it might be beneficial if the coating consists of a plurality of layers, which are considered in radial direction relative to the membrane contactor, that are situated directly on top of each other. The coating may be made from reactive or non-reactive agents, depending on the properties needed and the way of applying the coating to the membrane contactor.

Herein, in order to overcome shortcomings related to the wetting problems in membrane contactors, an exemplary method and system are described for an in-situ (in module) uniform and homogenous surface modification onto at least the absorber side of a bundle of hollow fibers that are placed within a membrane contactor module. The membrane contactor module may include a large number of about ten thousand (10,000) or more hollow fibers. The surface modification may include coating of a uniform hydrophobic layer onto inside and/or outside of a bundle of conventional non-expensive hydrophilic or low-hydrophobic hollow fibers while hollow fibers are placed within a membrane contactor module. The produced coated hollow fiber membrane contactors herein may have numerous advantages. For example, hydrophilic materials such as polysulfones (polysulfone or polyethersulfone) or polyamides that may be used consistent with the exemplary embodiments as the substrate material of the hollow fibers are commercially available and much cheaper than the materials used conventionally, thereby making a membrane contactor apparatus using the present coated hollow fibers much cheaper than a conventional one. The use of hydrophilic materials has not been considered until now because of the above described wetting problems of the pores by absorber liquid.

In an aspect of the present disclosure, an exemplary method for coating hollow fiber membranes is disclosed. The method may be used for simultaneously coating a uniform hydrophobic polymer layer on at least one of the inside or outside surfaces of a bundle of hollow fiber membranes that are made from a non-expensive material, such as a hydrophilic polymer. Exemplary coating method may be applied on the hollow fiber membranes while the bundle of hollow fiber membranes may be placed in a membrane module, so that simultaneously coating a large number of hollow fiber membranes may be possible.

Figure 2A:
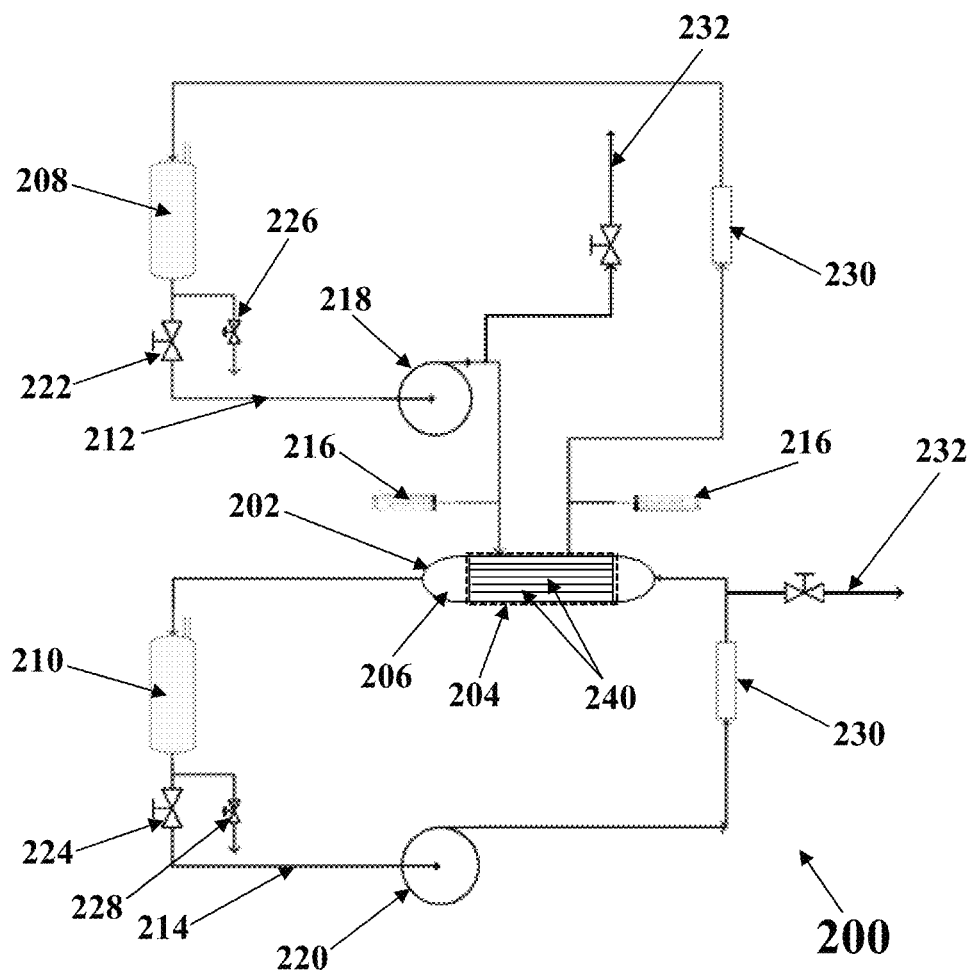
FIG. 2A illustrates a schematic view of an exemplary implementation of a continuous circulating circuit for coating hollow fiber membranes, consistent with one or more exemplary embodiments of the present disclosure.

FIG. 1 shows a method 100 for coating hollow fiber membranes, consistent with exemplary embodiments of the present disclosure. Method 100 may include preparing a continuous circulating circuit (step 101), which may include an exemplary continuous circulating circuit 200 that is shown in FIG. 2A. FIG. 2A shows a schematic view of an exemplary implementation of the continuous circulating circuit 200 for coating hollow fiber membranes, consistent with one or more exemplary embodiments of the present disclosure. The continuous circulating circuit 200 may include a membrane contactor module 202, at least two liquid reservoirs 208 and 210, at least two pipeline paths 212 and 214, and at least one injector 216. The membrane contactor module 202 may include a plurality of hollow fiber membranes 204, where each hollow fiber membrane 240 may include an inside area and an outside area (described in further detail below); and a housing 206. The plurality of hollow fiber membranes 204 may be extended inside the housing 206. The liquid reservoirs 208 and 210 may contain a solvent and the injector 216 may contain a coating solution. The membrane contactor module 202 and the liquid reservoirs 208 and 210 may be connected through the pipeline paths 212 and 214 and the injector 216 may have an access to the membrane contactor module 202 via one of the pipeline paths 212 and 214. In an exemplary embodiment, the housing 206 may be impermeable to liquids and may be configured to allow the plurality of hollow fiber membranes 204 to extend therein.

Figure 2B:
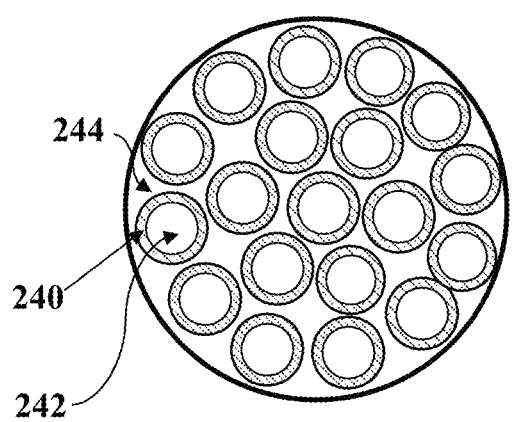
FIG. 2B illustrates a schematic cross sectional view of an exemplary hollow fiber membrane among the plurality of hollow fiber membranes within an exemplary membrane contactor module, consistent with one or more exemplary embodiments of the present disclosure.

FIG. 2B shows a schematic cross sectional view of an exemplary membrane contactor module 202 representing a cross sectional view of an exemplary hollow fiber membrane 240 of the plurality of hollow fiber membranes 204, consistent with one or more exemplary embodiments of the present disclosure. The hollow fiber membrane 240 may include an inside area 242 and an outside area 244. In an exemplary implementation, the hollow fiber membrane 240 may be made from a porous polymeric material, which may include a hydrophilic polymer or a polymer with low-hydrophobicity, or combinations thereof. In an exemplary embodiment, the hollow fiber membrane 240 may be made from a polysulfone, a polyethersulfone, a polyamide, polypropylene (PP), or combinations thereof.

With reference to FIG. 2A, in some exemplary implementations, the continuous circulating circuit 200 may further include at least two circulation pumps 218 and 220 that may be configured to supply a liquid, for example, a solvent or a coating solution from the liquid reservoirs 208 and 210 to the membrane contactor module 202 and discharge the liquid therefrom. In an exemplary embodiment, the continuous circulating circuit 200 may further include at least two valves 222 and 224 that may be connected to the liquid reservoirs 208 and 210 and may be configured to control the flow of a liquid from the liquid reservoirs 208 and 210 and through the pipeline paths 212 and 214. In some exemplary embodiments, each of the liquid reservoirs 208 and 210 may be connected to a respective drain valve 226 and 228 for discharging a liquid from the liquid reservoirs 208 and 210. In some exemplary embodiments, each of the pipeline paths 212 and 214 may include a flow meter instrument 230 that may be used for monitoring the flow rate of a liquid through the pipeline paths 212 and 214. In some exemplary embodiments, each of the pipeline paths 212 and 214 may further include a degassing pass 232 that may be configured to remove undesirable gases from the pipeline paths 212 and 214.

Referring again to FIG. 1, method 100 may further include circulating the solvent through the continuous circulating circuit 200 to wet the plurality of hollow fiber membranes 204 with the solvent (step 102), filling at least one of the two liquid reservoirs 208 and 210 with a coating solution (step 103), forming a coating layer on a surface of at least one of the inside area 242 or the outside area 244 of the plurality of wetted hollow fiber membranes 204 by circulating the coating solution through the continuous circulating circuit 200 (step 104), and forming a uniform coating layer by injecting the coating solution via the injector 216 for intrusion of the coating solution through the coating layer (step 105). The method 100 may further include draining the solvent and the coating solution from the membrane contactor module 202 (step 106), and forming a plurality of dried hollow fiber membranes with the uniform coating layer by drying the membrane contactor module 202 (step 107).

In step 102, the solvent may be circulated through the continuous circulating circuit 200 to fill up the inside area 242 and the outside area 244 of the plurality of hollow fiber membranes 204 with the solvent in order to wet the plurality of hollow fiber membranes 204 with the solvent and forming a plurality of wetted hollow fiber membranes 204. In some exemplary implementations, the solvent may include a wetting agent that may be suited for interacting with pores of the plurality of hollow fiber membranes 204, in such a way that a penetration of the coating solution inside the pores may be prevented during circulation of the coating solution through the continuous circulating circuit 200 in step 104. In an exemplary embodiment, the solvent may include water, or n-Hexane, or n-Heptane, or Benzene, or N-Methyl-2-pyrrolidone (NMP), or combinations thereof.

In an exemplary embodiment, the wetting agent may be immiscible with the coating solution. The wetting agent may include, for example, water. In order for the coating agent not to penetrate the pores of the plurality of hollow fiber membranes 204, the wetting agent may be applied in a manner that it is placed within the membrane contactor module 202 and in contact with the plurality of hollow fiber membranes 204 in step 102 to fill the pores of the plurality of hollow fiber membranes 204 with the wetting agent before the coating solution may be fed to the membrane contactor module 202 in step 104. Further, it may be possible that the coating solution displaces the wetting agent over time from the pores of the plurality of hollow fiber membranes 204 and then penetrates into the pores afterwards. In order to prevent penetrating the coating solution into the pores, it might be beneficial to build up a certain pressure, for example, about 0.1 bar in the wetting agent side/compartment such that it may be able to withstand any pressure from the coating solution. An exemplary implementation of scenario with wetting the pores of the plurality of hollow fiber membranes 204 is shown in FIGS. 3A and 3B.

Figure 3A:
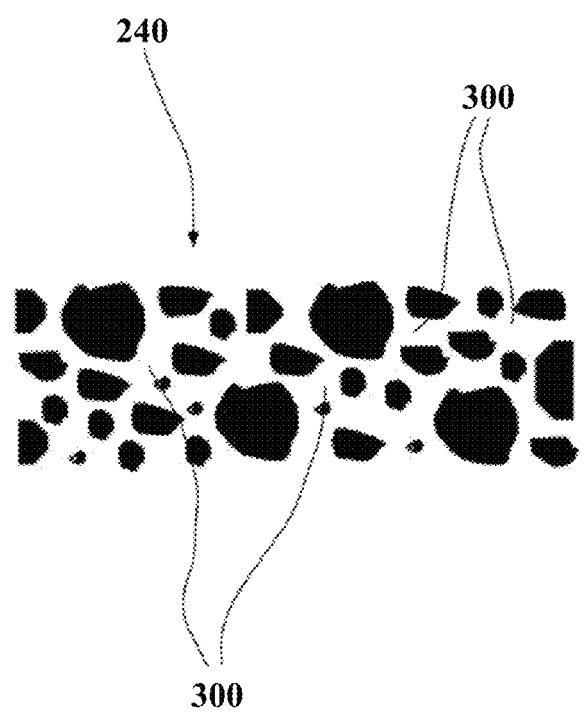
FIG. 3A illustrates a sectional view of an exemplary hollow fiber membrane of the plurality of hollow fiber membranes, consistent with one or more exemplary embodiments of the present disclosure.
Figure 3B:
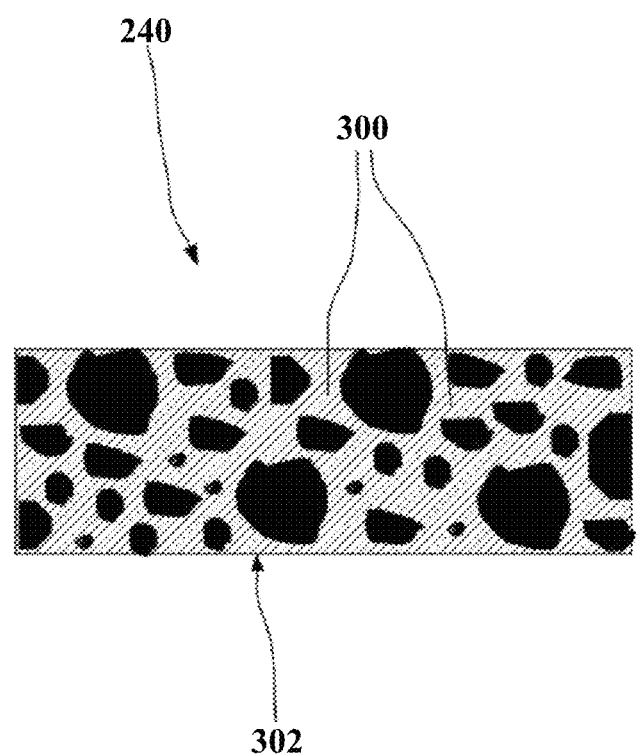
FIG. 3B illustrates a sectional view of an exemplary wetted hollow fiber membrane, consistent with one or more exemplary embodiments of the present disclosure.

FIG. 3A shows a sectional view of an exemplary hollow fiber membrane 240 of the plurality of hollow fiber membranes 204, consistent with one or more exemplary embodiments of the present disclosure. The hollow fiber membrane 240 may include pores 300 as shown in this figure. In an exemplary implementation, in order to prevent the coating solution from penetrating into the pores 300 of the hollow fiber membrane 240, the method 100 as shown may include the step 102 of wetting the pores 300 previous to apply the coating solution to the hollow fiber membrane 240. In order to do so, the solvent, including the wetting agent, may be circulated through the continuous circulating circuit 200 and distributed to the plurality of hollow fiber membranes 204. For this purpose, the solvent may be pumped by the circulation pumps 218 and 220 from the liquid reservoirs 208 and 210 to the membrane contactor module 202 and eventually back to the liquid reservoirs 208 and 210. FIG. 3B shows a sectional view of an exemplary wetted hollow fiber membrane 240, consistent with one or more exemplary embodiments of the present disclosure. After distribution of the solvent within the plurality of hollow fiber membranes 204, the wetting agent 302 may penetrate into the pores 300 of the hollow fiber membrane 240 from the inside area 242 or the outside area 244 of the hollow fiber membrane 240. After wetting the pores 300, the wetting agent 302 may block the pores 302 and thereby may prevent their penetration by the coating solution.

In step 103, at least one of the two liquid reservoirs 208 and 210 may be filled with a coating solution, for example, the solvent of at least one of the two liquid reservoirs 208 and 210 may be replaced with a coating solution. In some exemplary implementations, one or both liquid reservoirs 208 and 210 may be discharged from the solvent and filled by the coating solution according to the purpose of that a surface of the inside area 242 or the outside area 244 of the plurality of hollow fiber membranes 204 to be coated.

As used herein, a "coating solution" may refer to a liquid containing a coating agent that may include exemplary barriers that may prevent an absorber fluid from penetrating the pores of a membrane contactor including a hollow fiber membrane. The pores should remain free of the absorption fluid such that a gas that is to be extracted in a gas-liquid application may diffuse through the pores more efficiently. In an exemplary embodiment, the coating solution may include a hydrophobic polymeric material that may include one of a siloxane-based hydrophobic polymer, polydimethylsiloxane (PDMS), a polyaniline (PANI), polyvinylidene difluoride (PVDF), or combinations thereof. These materials may be both very easy to obtain and effective in terms of preventing the absorber liquid from getting into contact with the hollow fiber membrane 240, filling porous structure of the hollow fiber membrane 240, or penetrating into the other side of the hollow fiber membrane 240 when the hollow fiber membrane 240 is used as a membrane contactor. In an exemplary embodiment, the hydrophobic polymeric material may be present in the coating solution with a concentration of between about 2% and about 15%, for example 5%.

In step 104, a coating layer may be formed on a surface of at least one of the inside area 242 or the outside area 244 of the plurality of wetted hollow fiber membranes 204 obtained from step 102 by circulating the coating solution through the continuous circulating circuit 200. In an exemplary embodiment, the coating solution may be pumped from at least one of the two liquid reservoirs 208 and 210 that may be filled with the coating solution in step 103 by utilizing an associated circulation pump 218 and/or 220 and through the respective pipeline paths 212 and 214. The coating solution may be circulated in the continuous circulating circuit 200 such that the coating solution may be continuously guided alongside the plurality of wetted hollow fiber membranes 204. Inside the membrane contactor module 202, the coating solution may be guided alongside the wetted hollow fiber membranes 204 and then circulated back to the liquid reservoir 208 and/or 210. Therefore, a coating layer may be formed on a surface of at least one of the inside area 242 or the outside area 244 of the plurality of wetted hollow fiber membranes 204.

Figure 2C:
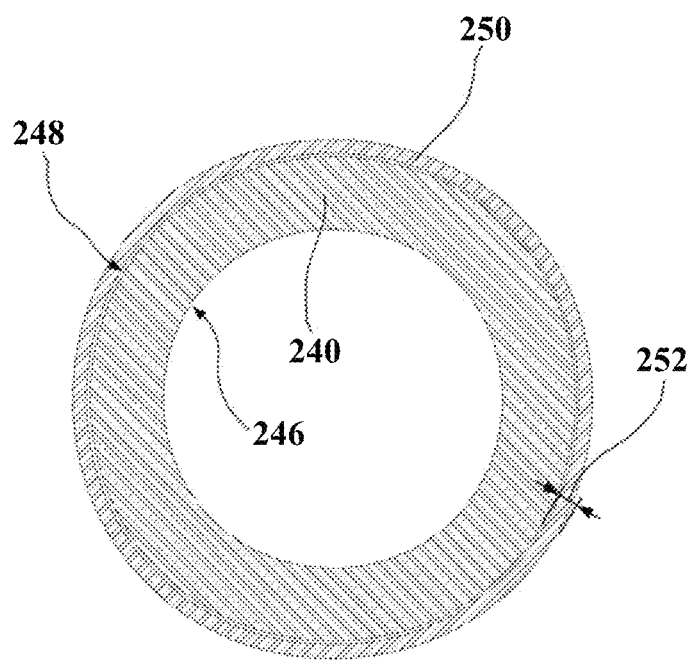
FIG. 2C illustrates a schematic cross sectional view of an exemplary hollow fiber membrane which is coated by a coating layer, consistent with one or more exemplary embodiments of the present disclosure.

FIG. 2C shows a schematic cross sectional view of an exemplary wetted hollow fiber membrane 240 which is coated by a coating layer 250 using the exemplary method 100. In an exemplary implementation, the coating layer 250 may be formed on an inside surface 246 and/or an outside surface 248 of the hollow fiber membrane 240. In an exemplary embodiment, the coating layer 250 may have a thickness 252 less than about 200 μm, which may be measured in a radial direction away from the hollow fiber membrane 240. In some exemplary embodiments, the coating layer 250 may have a thickness 252 less than about 20 μm. In some exemplary embodiments, the coating layer 250 may have a thickness 252 between about 5 μm and about 50 μm. It should be noted that a coating layer 250 with a thickness within the given values may not influence the mechanical properties of the hollow fiber membrane 240 used as a membrane contactor but may be, nonetheless, suitable for reliably preventing contact between an absorber liquid and the membrane contactor.

Figure 3C:
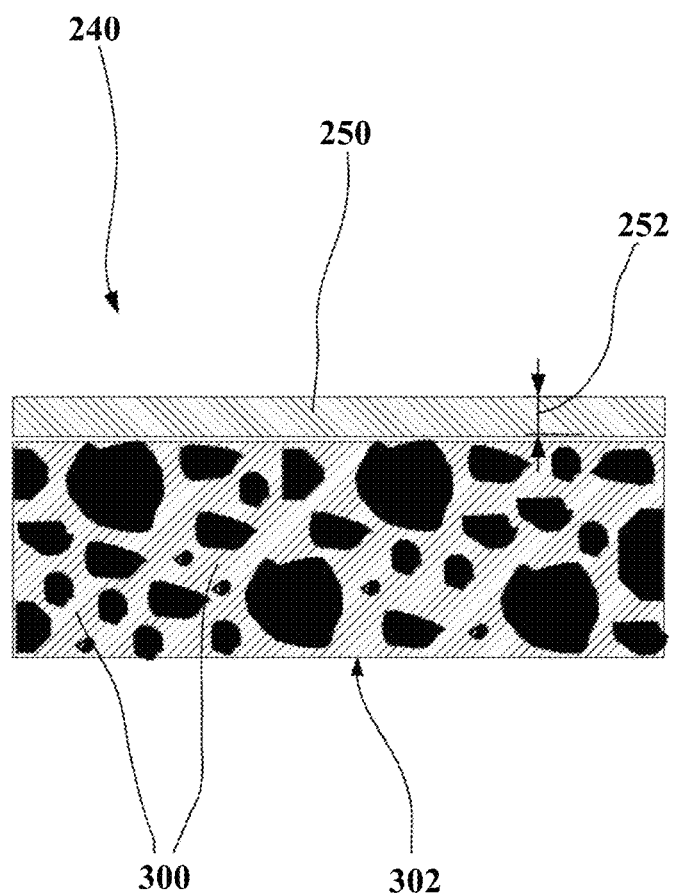
FIG. 3C illustrates a sectional view of an exemplary wetted hollow fiber membrane coated with a coating layer, consistent with one or more exemplary embodiments of the present disclosure.

In addition, FIG. 3C shows a sectional view of the exemplary wetted hollow fiber membrane 240 coated with the coating layer 250 with the thickness 252 while the pores 300 may be wetted with the wetting agent 302, consistent with one or more exemplary embodiments of the present disclosure. In an exemplary embodiment, when coating of one surface side of the plurality of wetted hollow fiber membranes 204 is desired, circulating the solvent through the membrane contactor module 202 may be held up during the circulation of the coating solution, such that the coating liquid cannot displace the wetting agent 302 throughout the process.

In step 105, after obtaining a primary coating layer in step 104, the coating solution may be injected by at least one injector 216 into the membrane contactor module 202 for intrusion of the coating solution through the coating layer 250 to form a uniform coating layer. In an exemplary implementation, injecting the coating solution by the injector may include stopping the circulation of the coating solution through the continuous circulating circuit, filling the injector by the coating solution, and injecting the coating solution by the injector into the membrane contactor module through at least one of the two pipeline paths.

In an exemplary embodiment, the injector 216 may include a syringe pump with a capacity of about 50 ml. The coating solution may be injected by at least one injector 216 into the membrane contactor module 202 with a flow rate of about 30 ml/min and the amount of the coating solution that may be injected by the injector 216 may be between about 10 ml and about 120 ml.

In an exemplary embodiment, the injection of the coating solution may be carried out in order to applying a pressure onto the coating layer 250 that may lead to the penetration of some of the coating solution into the hollow fiber membrane pores. This penetration may cause filling of a portion of the pores with the coating solution, resulting in forming a uniform coating layer in which a part of the uniform coating layer may be inside the pores. The uniform coating layer with the penetrated section within the pores may provide a strong joint between the coating material and the hollow fiber membrane. Moreover, the obtained uniform coating layer may significantly prevent wetting problems of the hollow fiber membranes without any leakage.

Figure 4:
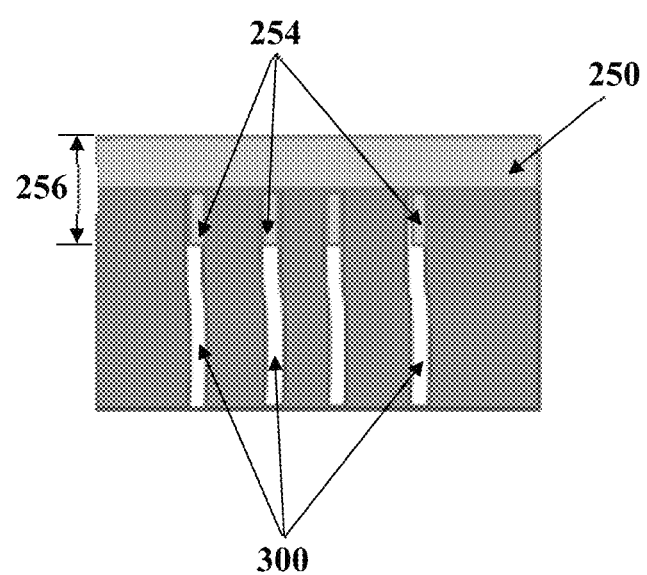
FIG. 4 illustrates an exemplary implementation of the intrusion of the coating solution through the coating layer, consistent with one or more exemplary embodiments of the present disclosure.

An exemplary implementation of the intrusion of the coating solution through the coating layer 250 is shown in FIG. 4, consistent with one or more exemplary embodiments of the present disclosure. In an exemplary embodiment, after circulation of the solvent and the coating solution through the continuous circulating circuit 200, an amount of the coating solution may be injected with a constant pressure into at least one of the inside area 242 or the outside area 244 of the plurality of wetted hollow fiber membranes 204 for an intrusion 254 of the coating solution through the coating layer 250 and the pores 300 to form a uniform coating layer 256 that may include a mechanically enhanced and defect-free uniform coating layer.

In step 106, the solvent and the coating solution may be drained/discharged from the membrane contactor module 202 to make the membrane contactor module 202 including a plurality of coated hollow fiber membranes ready for future use in separation applications, for example, gas-liquid contacting purposes for separating a specific gas from a gas stream. In an exemplary embodiment, the solvent and the coating solution may be drained/discharged from the membrane contactor module 202 by circulating a gas, for example, air or nitrogen through the membrane contactor module 202.

In step 107, a plurality of dried hollow fiber membranes 204 with the uniform coating layer 256 may be formed by drying the membrane contactor module 202. After the coating solution is drained from the membrane contactor module 202 in exemplary step 106, a rather thin but very even layer of the coating solution may be stuck on the coated side of each hollow fiber membrane. In addition, a minor amount of wetting agent may remain within the pores 300 after the draining step 106. Hence, a drying process may be applied in such a way that the coating solution and the solvent may be dried out from the membrane contactor module 202 to leave a plurality of dried hollow fiber membranes 204 with the uniform coating layer 256.

In an exemplary implementation, drying the membrane contactor module 202 may include at least one of curing the membrane contactor module 202 in an oven at a temperature between about 50° C. and about 120° C., or drying the membrane contactor module 202 by UV irradiation, or drying the membrane contactor module 202 by circulating a drying gas, for example, air or nitrogen through the membrane contactor module 202. In an exemplary embodiment, drying the membrane contactor module 202 may include supplying the membrane contactor module 202 with a drying medium, for example air, after drainage of the coating solution, which may cause the drying period to be reduced such that the procedure of method 100 may be carried out in a shorter period of time compared to other drying methods. Further, during or after drainage of the coating solution and the solvent, or after drying of the membrane contactor module 202, the plurality of hollow fiber membranes 204 may be charged with curing means, for example, with UV radiation, or elevating temperature and/or pressure. Such a curing treatment may be beneficial with respect to the properties of the coating layer, depending on the coating material that may be used.

Figure 3D:
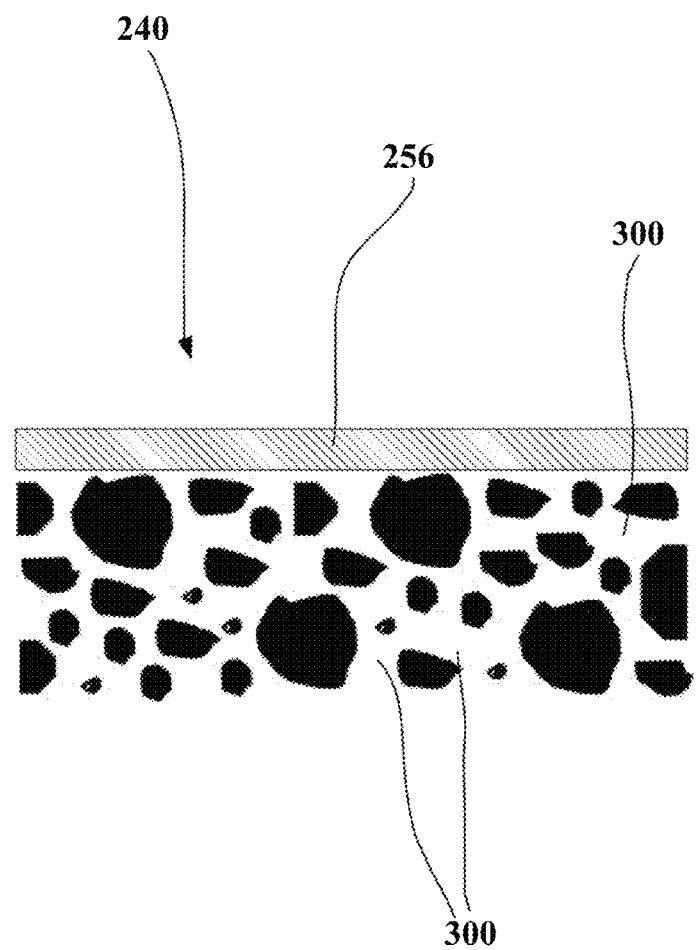
FIG. 3D illustrates a sectional view of an exemplary dried hollow fiber membrane coated with a uniform coating layer, consistent with one or more exemplary embodiments of the present disclosure.

FIG. 3D shows a sectional view of an exemplary dried hollow fiber membrane 240 coated with a uniform coating layer 256, consistent with one or more exemplary embodiments of the present disclosure. It may be observed that the wetting agent 302 may not be present within the pores 300 after draining the solvent and the coating solution from the membrane contactor module 202 in step 106 and drying the membrane contactor module 202 in step 107.

Furthermore, the coating layer and consequently, the uniform coating layer may include a composite coating, which may include at least two different coating layers made from different coating agents using at least two different coating solutions. For this purpose, the method 100 may further include repeating filling at least one of the two liquid reservoirs with a coating solution (step 103), circulating the coating solution through the continuous circulating circuit to form a coating layer on a surface of at least one of the inside area or the outside area of the plurality of wetted hollow fiber membranes (step 104), and injecting the coating solution by the injector for intrusion of the coating solution through the coating layer to form a uniform coating layer (step 105) in a cycle for different coating solutions, subsequently. For example, a double coating layer may be made of two coating layers which may be applied to the plurality of hollow fiber membranes in two consecutive cycles. For this purpose, first, a first coating solution may be drained from the membrane contactor module and, afterwards, a second coating solution may be fed thereto, thereby eventually forming the double coating layer.

Figure 3E:
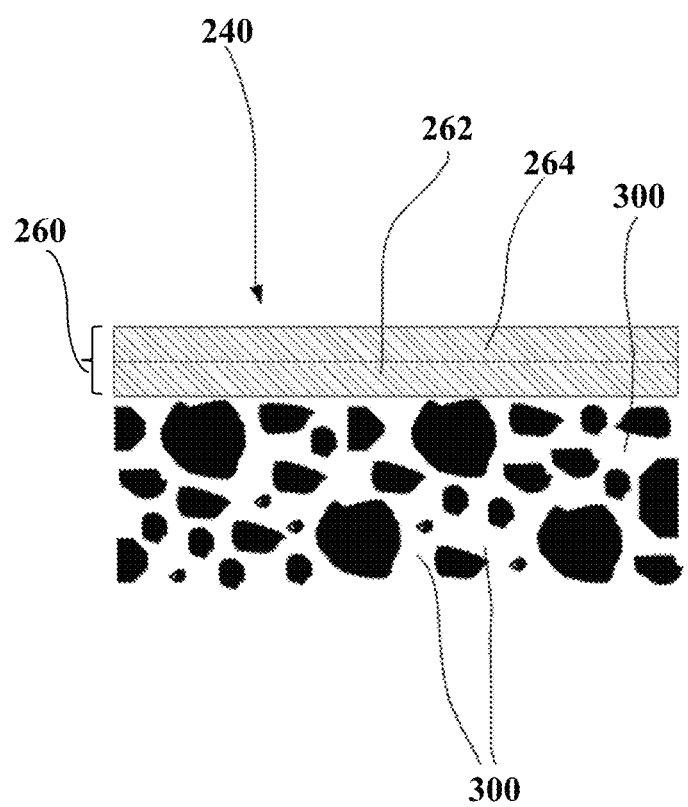
FIG. 3E illustrates a sectional view of an exemplary dried hollow fiber membrane coated with a composite uniform coating layer, consistent with one or more exemplary embodiments of the present disclosure.

Accordingly, in some exemplary implementations, the method 100 may further include forming a composite coating layer on a surface of at least one of the inside area or the outside area of the plurality of hollow fiber membranes. As shown in FIG. 3E, the composite coating layer 260 may include at least two uniform coating layers, including a second uniform coating layer 264 placed on top of a first uniform coating layer 262. In an exemplary embodiment, filling at least one of the two liquid reservoirs with a coating solution (step 103), circulating the coating solution through the continuous circulating circuit (step 104), and injecting the coating solution by the injector (step 105) may be repeated in a cycle for at least two times, including at least a first time and a second time, where a first coating solution may be used at the first time and a second coating solution may be used at the second time in the cycle. Therefore, the first uniform coating layer 262 may be formed at the first time a surface of one side of the exemplary dried hollow fiber membrane 240 and the second uniform coating layer 264 may be formed at the second time on the first uniform coating layer 262.

In an exemplary implementation, the membrane contactor module 202 equipped with the uniformly coated hollow fiber membranes 204 may be used for extraction of at least one gas using exemplary methods of extracting including, but not limited to, gas sweetening and $CO_2$ capturing from a gaseous flow, for example, from air, etc.

Example 1

Coating of Polyethersulfone Hollow Fibers

In this example, a membrane module including hollow fiber membranes made of polyethersulfone Xevonta 20 was supplied and the hollow fibers Xevonta 20 were coated by a silicone resin E43. The inside and outside areas of the hollow fibers were filled by n-Hexane. Then, n-Hexane in the outside area of the hollow fibers was substituted with a solution of silicone resin E43 (about 10% wt.) and was circulated with a flow rate of about 100 cc/min for about 5 minutes. Also, n-Hexane was circulated simultaneously with a flow rate of about 100 cc/min. Thereafter, about 40 cc of the solution of silicone resin E43 was injected by syringes with a volume of about 50 cc. Finally, n-Hexane and the solution of silicone resin E43 were drained from the membrane module and the membrane module was held in an oven at about 60° C. for about 30 minutes. In addition, a similar coating process was carried out to coat the polyethersulfone hollow fibers Xevonta 20 by a polydimethylsiloxane (PDMS RT622) coating layer.

Figure 5A:
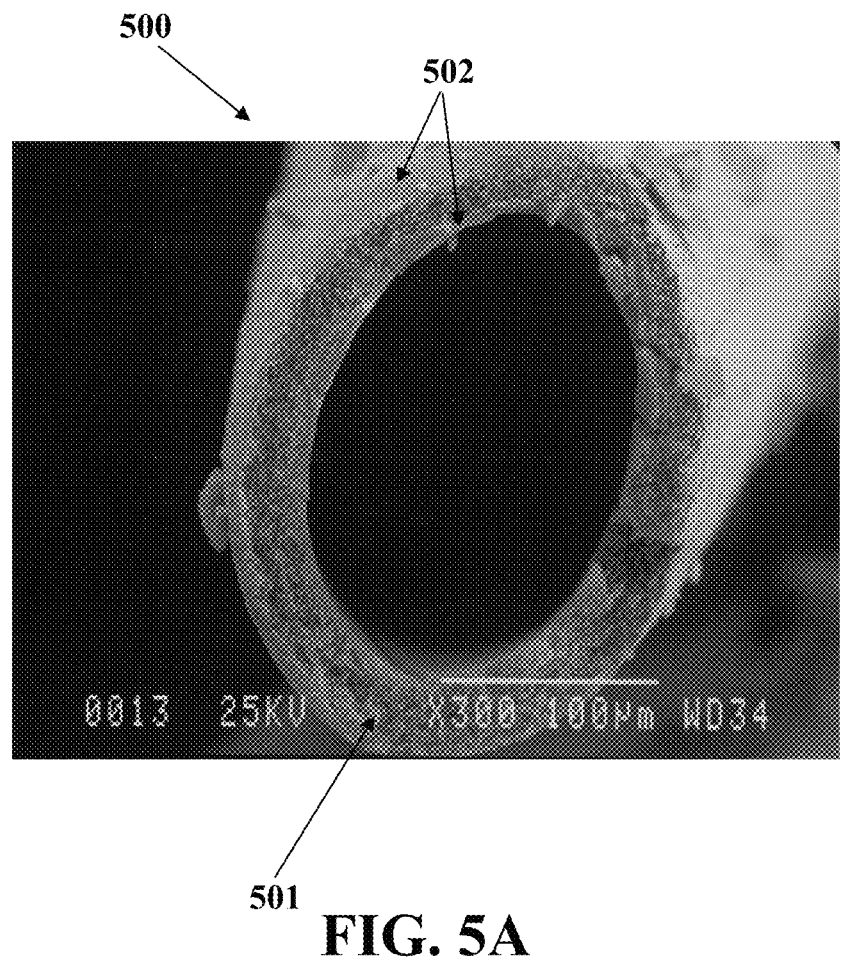
FIG. 5A illustrates an emission scanning electron microscope (SEM) image of an exemplary polyethersulfone hollow fiber membrane coated with a PDMS coating layer on the inside surface and a PDMS coating layer on the outside surface of the hollow fiber membrane, consistent with one or more exemplary embodiments of the present disclosure.
Figure 5B:
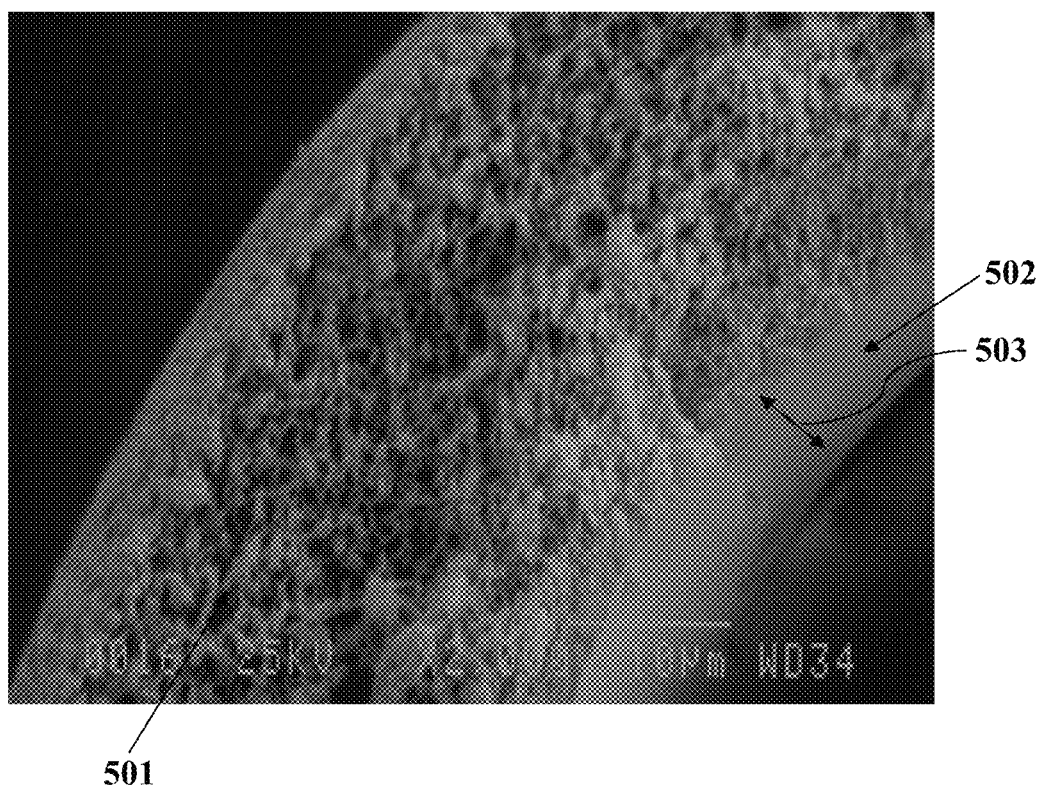
FIG. 5B illustrates a an emission scanning electron microscope (SEM) image of a cross section of an exemplary polyethersulfone hollow fiber membrane coated with a uniform and defect-free PDMS layer, consistent with one or more exemplary embodiments of the present disclosure.

FIG. 5A shows a SEM image of an exemplary polyethersulfone hollow fiber membrane 500 with a porous structure 501 coated with a PDMS coating layer 502 on both inside and outside surfaces of the hollow fiber membrane, consistent with one or more exemplary embodiments of the present disclosure. Furthermore, FIG. 5B shows a more magnified SEM image of a cross section of the exemplary polyethersulfone hollow fiber membrane 500 coated with the uniform and defect-free PDMS coating layer 502, consistent with one or more exemplary embodiments of the present disclosure. As may be observed from this figure, the thickness of the PDMS coating layer 502 is about 5 μm.

Example 2

$CO_2$ Capturing by Coated Hollow Fiber Membranes

Figure 6:
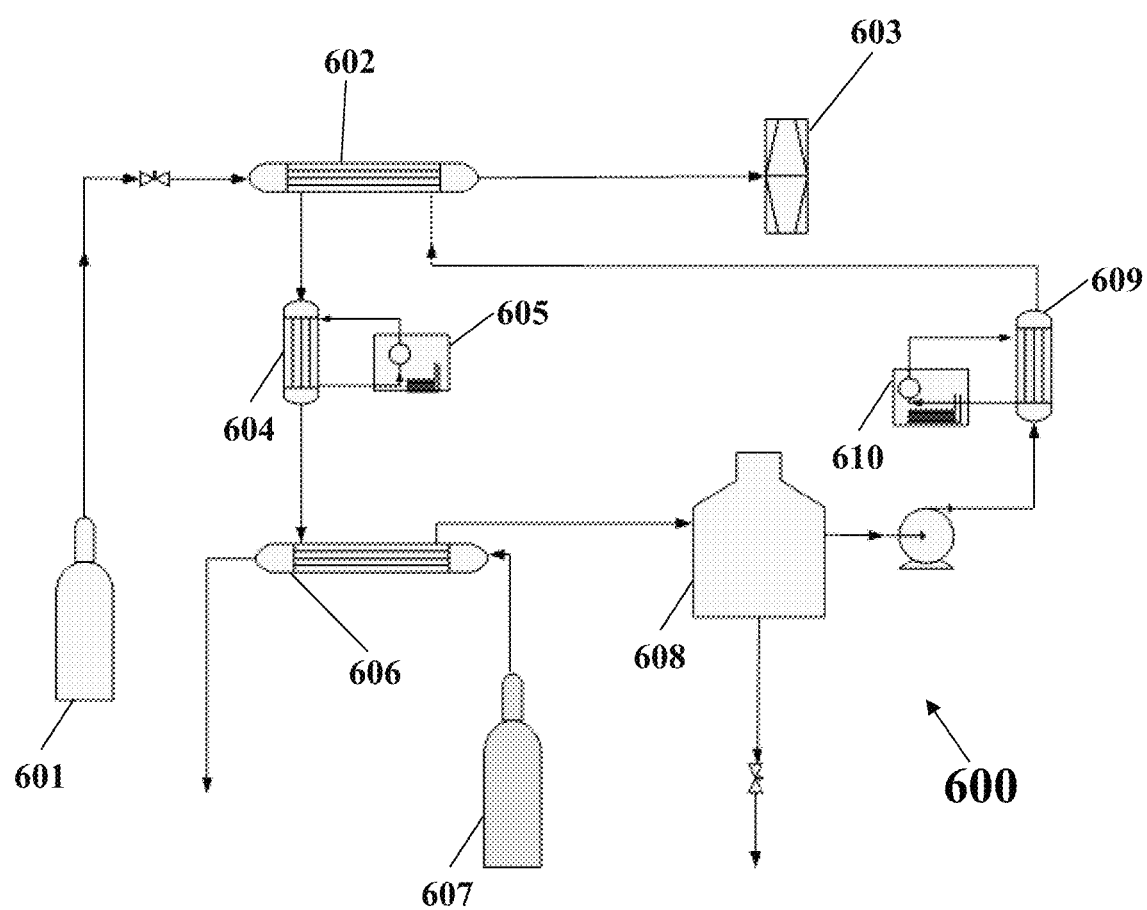
FIG. 6 illustrates an exemplary implementation of a system for extracting $CO_2$ from air, consistent with one or more exemplary embodiments of the present disclosure.

In this example, $CO_2$ was separated from air using an exemplary membrane contactor module 202 equipped with the uniformly coated hollow fiber membranes 204, which may be prepared according to the method 100 of the present disclosure. For this purpose, the exemplary membrane contactor module 202 was used in an exemplary separation system 600 as shown in FIG. 6, consistent with one or more exemplary embodiments of the present disclosure. In an exemplary $CO_2$ capturing process using system 600, a gas feed flow including air and $CO_2$ flows from an air-$CO_2$ reservoir 601 to an exemplary absorber membrane contactor 602, which is an example of the membrane contactor module 202 and includes an absorber liquid. Purified air may then analyzed by a GC (Gas Chromatography) device 603 for measuring the remained $CO_2$ concentration within the effluent air. The absorber liquid is entered to a desorber membrane contactor 606 after flowing through a hot exchanger 604 which is equipped with a hot circulator 605. An air flow from an air reservoir 607 flows through desorber membrane contactor 606 to regenerate the absorber liquid. The regenerated absorber liquid then flows to an adsorbent solution tank 608 and after flowing through a cold exchanger 609 which is equipped with a cold circulator 610 is recirculated to the absorber membrane contactor 602.

The system 600 was used for extracting $CO_2$ from air to obtain a $CO_2$ percentage in the air flow of less than about 2% mol. Table 1 represents the operational conditions and the initial and final $CO_2$ concentrations in the air.

TABLE 1

Operational conditions and results of separation
of $CO_2$ from air by coated hollow fiber membranes.

| Liquid-Gas Membrane Contactor | Liquid Flow Rate (ml/min) | Gas Flow Rate (ml/min) | $P_{CO2,\ in}$ (mm Hg) | $C_{CO2,\ in}$ ($ml_{CO2}/L_{solution}$) | $P_{CO2,\ out}$ (mm Hg) | $C_{CO2,\ out}$ ($ml_{CO2}/L_{solution}$) |
|---|---|---|---|---|---|---|
| Contactor 1 as excreting module | 50 | 4000 | 4.11 | 5.494652406 | 5.78 | 7.727152406 |
|  | 100 | 4000 | 4.73 | 6.323529412 | 7.26 | 9.706769412 |
|  | 400 | 4000 | 4.21 | 5.628342246 | 10.27 | 13.73266225 |
|  | 800 | 4000 | 4.07 | 5.441176471 | 11.20 | 14.97669647 |
| Contactor 1 as absorbing module | 1200 | 2000 | 73.27 | 97.95454545 | 21.09 | 28.19614545 |
|  | 1200 | 1000 | 74.12 | 99.09090909 | 15.06 | 20.13186909 |
|  | 1200 | 200 | 74.02 | 98.95721925 | 6.53 | 8.731619251 |

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for coating hollow fiber membranes, the method comprising:
preparing a continuous circulating circuit, comprising:
a membrane contactor module, comprising:
a plurality of hollow fiber membranes, wherein each hollow fiber membrane includes an inside area and an outside area; and
a housing, wherein the plurality of hollow fiber membranes are extended inside the housing;
two liquid reservoirs, the liquid reservoirs containing a solvent;
two pipeline paths, wherein the membrane contactor module and the two liquid reservoirs are connected through the two pipeline paths; and
at least one injector, wherein the injector has an access to the membrane contactor module via one of the two pipeline paths;

forming a plurality of wetted hollow fiber membranes with the solvent by circulating the solvent through the continuous circulating circuit;

filling at least one of the two liquid reservoirs with a coating solution;

forming a coating layer on a surface of at least one of the inside area or the outside area of the plurality of wetted hollow fiber membranes by circulating the coating solution through the continuous circulating circuit; and forming a uniform coating layer by injecting the coating solution by the injector for intrusion of the coating solution through the coating layer, wherein the solvent comprises a wetting agent and the solvent is immiscible with the coating solution.

2. The method of claim 1, wherein the method further comprises:

draining the solvent and the coating solution from the membrane contactor module; and forming a plurality of dried hollow fiber membranes with the uniform coating layer by drying the membrane contactor module.

3. The method of claim 2, wherein drying the membrane contactor module comprises at least one of curing the membrane contactor module in an oven, drying the membrane contactor module by UV irradiation, and supplying the membrane contactor module with a drying agent.

4. The method of claim 1, wherein injecting the coating solution by the injector comprises injecting the coating solution with a volume amount between 10 ml and 120 ml.

5. The method of claim 1, wherein injecting the coating solution by the injector comprises injecting the coating solution with a flow rate of 30 ml/min.

6. The method of claim 1, wherein the plurality of hollow fiber membranes are made from a porous polymeric material, wherein the porous polymeric material includes one of a hydrophilic polymer, a polymer with hydrophobicity, or combinations thereof.

7. The method of claim 6, wherein the porous polymeric material comprises one of a polysulfone, a polyethersulfone, a polyamide, polypropylene (PP), or combinations thereof.

8. The method of claim 1, wherein the coating solution comprises a hydrophobic polymeric material that includes one of a siloxane-based hydrophobic polymer, polydimethylsiloxane (PDMS), a polyaniline (PANT), polyvinylidene difluoride (PVDF), or combinations thereof.

9. The method of claim 8, wherein the coating solution comprises the hydrophobic polymeric material with a concentration between 2% wt. and 15% wt.

10. The method of claim 9, wherein the coating solution comprises the hydrophobic polymeric material with a concentration of 5% wt.

11. The method of claim 1, wherein the uniform coating layer comprises a dense layer or a porous layer with a thickness less than 200 µm.

12. The method of claim 11, wherein the uniform coating layer has a thickness between 5 µm and 50 µm.

13. The method of claim 1, wherein the solvent comprises one of water, n-Hexane, n-Heptane, Benzene, N-Methyl-2-pyrrolidone (NMP), or combinations thereof.

14. The method of claim 1, wherein circulating the solvent through the continuous circulating circuit and circulating the coating solution through the continuous circulating circuit are done with a flow rate of circulation of less than 500 cc/min.

15. The method of claim 1, wherein the method further comprises:

forming a composite coating layer on a surface of at least one of the inside area or the outside area of the plurality of hollow fiber membranes, the composite coating layer comprising at least two uniform coating layers, comprising a second uniform coating layer placed on top of a first uniform coating layer.

16. The method of claim 1, wherein filling at least one of the two liquid reservoirs with a coating solution, circulating the coating solution through the continuous circulating circuit to form a coating layer on a surface of at least one of the inside area or the outside area of the plurality of wetted hollow fiber membranes, and injecting the coating solution by the injector for intrusion of the coating solution through the coating layer to form a uniform coating layer are repeated in a cycle for at least two times, comprising at least a first time and a second time, wherein a first coating solution is used at the first time and a second coating solution is used at the second time in the cycle.

17. A method for coating hollow fiber membranes, the method comprising:

preparing a continuous circulating circuit, comprising:

a membrane contactor module, comprising:

a plurality of hollow fiber membranes, wherein each hollow fiber membrane includes an inside area and an outside area; and a housing, wherein the plurality of hollow fiber membranes are extended inside the housing;

two liquid reservoirs, the liquid reservoirs containing a solvent;

two pipeline paths, wherein the membrane contactor module and the two liquid reservoirs are connected through the two pipeline paths; and at least one injector, wherein the injector has an access to the membrane contactor module via one of the two pipeline paths;

forming a plurality of wetted hollow fiber membranes with the solvent by circulating the solvent through the continuous circulating circuit;

filling at least one of the two liquid reservoirs with a coating solution;

forming a coating layer on a surface of at least one of the inside area or the outside area of the plurality of wetted hollow fiber membranes by circulating the coating solution through the continuous circulating circuit; and forming a uniform coating layer by injecting the coating solution by the injector for intrusion of the coating solution through the coating layer, wherein injecting the coating solution by the injector comprises:

stopping circulation of the coating solution through the continuous circulating circuit;

filling the injector by the coating solution; and injecting the coating solution by the injector into the membrane contactor module through at least one of the two pipeline paths.

* * * * *